3,214,491
FLEXIBLE POLYESTER RESINS
Joseph J. Stanton, New Castle, Del., assignor to Atlas Chemical Industries, Inc., Wilmington, Del., a corporation of Delaware
No Drawing. Filed Dec. 4, 1961, Ser. No. 156,973
12 Claims. (Cl. 260—871)

This invention relates to polyester resins, and in particular to flexible polyester resins which are copolymerizable with vinyl monomers and which are compatible with aromatic vinyl compounds to form an easily handled solution which may be blended with certain types of rigid polyesters to yield a cured product having improved impact strength over the rigid polyester alone.

Most prior commercial flexible type polyester resins are prepared from long chain saturated dicarboxylic acids such as adipic acid, glycols such as dipropylene glycol and a lesser amount of alpha unsaturated dicarboxylic acid than would normally be used to prepare a rigid type polyester. Long chain glycols such as polyethylene glycols and polypropylene glycols have also been used to prepare flexible polyester resins, but they are not generally used because of the low viscosity of the liquid resin and the poor water resistance of the cured polyester.

For many polyester resin end use applications, such as flooring, potting and encapsulation, gel coats on reinforced plastic boats and swimming pools, etc., it is essential that the polyester resin cure to a tough, resilient product. Generally, flexible polyester resins are blended with rigid type polyester resins in the proportions necessary to obtain the desired mechanical properties in the cured state. While the prior art flexible polyester resins frequently improve the impact strength of the resulting cured polyester blend, they often adversely affect other properties such as corrosion resistance and electrical properties. Furthermore, rigid polyester resins which have been blended with prior art flexible polyester resins generally have poor low temperature flexibility and poor thermal shock resistance in the cured state.

It is an object of this invention to provide an improved flexible type polyester resin.

Another object is to provide a flexible polyester resin which may be blended with an aromatic vinyl compound to form an easily handled, curable composition.

A further object of the invention is to provide a flexible polyester resin-rigid polyester resin blend which has improved impact strength, low temperature flexibility, thermal shock resistance and substantially retains the corrosion resistance and electrical properties of the rigid polyester resin component.

Other objects and purposes of this invention will be apparent to those skilled in the art in view of the description which follows.

It has been discovered that an improved flexible type polyester resin can be prepared by esterifying in approximately equimolar proportions higher oxyalkylene ethers of selected alkylidene diphenols with unsaturated dicarboxylic acids. More specifically, the invention comprises the esterification of a dihydric alcohol represented by the formula

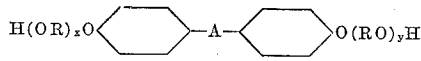

wherein A is a 2-alkylidene radical having from 3 to 4 carbon atoms, R is an alkylene radical having 2 to 4 carbon atoms, and $x$ and $y$ are each at least one and the average sum of $x$ and $y$ is at least 10 and not more than 20, with an approximately equimolar quantity of dicarboxylic acid, at least the major portion of which comprises an alpha unsaturated dicarboxylic acid.

The flexible polyester resins of this invention may be produced from dihydric alcohols prepared by the direct addition of alkylene oxide to alkylidene diphenols or by reacting an olefin halohydrin with an alkylidene diphenol as disclosed in U.S. Patent 2,331,265. Methods for performing the reactions are well known in the art, and it is unnecessary to describe them in detail for they are not the subject of this invention. It should be noted, however, that in mixtures of alcoholic and phenolic hydroxyl compounds, the alkylene oxides react preferentially with phenolic hydroxyl groups. Therefore, when a substantial molar excess of alkylene oxide is reacted with an alkylidene diphenol, both phenolic hydroxyls are etherified and the stated requirement that both $x$ and $y$ equal at least one is met.

In order to produce a flexible type polyester resin, a large number of moles of alkylene oxide must be reacted with each mole of alkylidene diphenol. In such reactions, there is a random distribution of the oxyalkylene groups between the two hydroxy ether groups, and in this specification, the alkylene oxide derivatives of alkylidene diphenols will be referred to generically as polyoxyalkylene $(x+y)$ ethers of diphenol containing an average of $(x+y)$ oxyalkylene groups per mole. $x+y$ is the total number of oxyalkylene groups per mole. If $x+y$ is less than 10, the resulting polyester resin, after esterification, tends to be more of a rigid type polyester resin which are too brittle to be classified as flexible. If $x+y$ is greater than 20, the resulting polyester resin tends to be low in crosslinking ability, and when blended with a rigid polyester resin, it tends to act as an unreactive plasticizer when lowers the tensile strength of the rigid resin without a comparable increase in percent elongation at break. Therefore, it is preferred that the sum of $x+y$ be at least 10 and not more than 20.

In preparing the polyoxyalkylene ethers of alkylidene diphenols, the alkylene oxide groups may be supplied by ethylene oxide, propylene oxide, butylene oxide or their equivalent halohydrins. It is generally preferred that the polyoxyalkylene ether contain oxyalkylene groups other than oxyethylene groups because oxyethylene compounds tend to form polyester resins which have poorer water resistance, though they may be used to prepare flexible polyester resins when water resistance is not of great importance.

The flexible polyester resins of this invention comprise the esterification products of the dihydric alcohols described above, esterified with an approximately equimolar amount of dicarboxylic acids, at least the major portion of which comprises an alpha unsaturated dicarboxylic acid. Examples of alpha unsaturated dicarboxylic acids which may be used to carry out the esterification are maleic acid, and its equivalent anhydride, and fumaric acid. Minor proportions of the esterifying dicarboxylic acid may comprise saturated acids, aromatic acids or other unsaturated aliphatic acids, such as, for example, succinic acid, phthalic acid or itaconic acid. It is usually preferred that at least about 80 mole percent of the dicarboxylic acid be alpha unsaturated.

The flexible polyester resins of this invention may be prepared by esterification techniques well known in the art. The dihydric alcohol and dicarboxylic acid are usually reacted in amounts such that at the completion of the reaction their radicals are present in substantially stoichiometric proportions. The reaction may be performed in an inert atmosphere, employing moderate temperatures and substantially atmospheric pressure during the early stages to minimize the loss of dicarboxylic acid by volatilization, raising the temperature and reducing the pressure in the later stages of the reaction. Esterification catalysts may be used in certain case, although it is generally preferred to carry out the reaction in the absence of catalyst to avoid contamination of the final resinous product with catalyst residue. If desired, a small amount of a polymerization inhibitor such as hydroquinone, pyrogallol, or the like, may be added to the charge during the esterification or after the esterification has been completed.

The flexible polyester resins of this invention are copolymerizable with vinyl compounds to yield resins useful in the coating, casting and laminating arts. Since the flexible polyester resins may be blended with aromatic vinyl compounds, such as styrene, to form an easily handled solution, copolymerization products of the flexible polyester resins and aromatic vinyl compounds are of particular interest. The high degree of compatibility between said polyester resins and aromatic vinyl compounds permits compounding over a wide range of concentrations. In fact, copolymers may be formed from styrene and the flexible polyester resins containing as much as 95% styrene or as little as 5% styrene by weight, though copolymers containing from 30 to 70% styrene are generally more useful. Aromatic vinyl solutions containing the flexible polyester resins of this invention may be cured using methods well known in the art to an elastic, crosslinked copolymeric material.

Alternatively, the aromatic vinyl solution containing the flexible polyester resin may be blended with a rigid type polyester resin which yields a cured product having greater impact strength than the rigid polyester resin alone. It has been found that the flexible polyester resins of this invention are not compatible with all types of rigid polyester resins, but are compatible with rigid polyester resins prepared from aromatic type hydroxyl bearing materials such as the rigid polyester resins described in U.S. Patents 2,634,251 and 2,662,069. When the flexible polyester resins of this invention are blended with rigid type polyester resins, a cured polyester product having excellent corrosion resistant properties and electrical properties may be prepared. The cured, blended polyester product may also possess flexibility at low temperatures and resistance to thermal shock.

An aromatic vinyl solution containing a flexible polyester resin of this invention may be blended with an aromatic vinyl solution of a rigid type polyester resin in various proportions depending upon the particular application of the blend and the properties desired. In general, blends containing from about 0.1 to about 9 parts by weight of flexible polyester solution per part of rigid polyester solution are suitable for most commercial applications.

The flexible polyester resins of this invention may be used in the same applications as commercial flexible polyester resins are currently being used, such as automobile body patching compounds, flooring compounds, potting and encapsulation, etc. In addition, blends of rigid type polyester resins and flexible polyester resins of this invention may be used in the same applications as currently used rigid polyester resins, particularly where good impact strength is a desirable property.

The preparation of the flexible polyester resins of this invention and some of their improved properties, especially when blended with rigid type polyester resins, are illustrated in the following examples.

*Example I*

A flexible polyester resin was prepared in the following manner: 1722 g. (1.61 moles) of polyoxypropylene (16) isopropylidene diphenol, having an average of 16 oxypropylene groups per mole, were charged to a 3 liter round bottom flask equipped with a stirrer, $CO_2$ inlet, thermowell and condenser. 174 g. (1.5 moles) of fumaric acid and 0.19 g. of hydroquinone were slowly added to the diphenol with stirring and at room temperature. The reactants were heated to about 210° C. and held at this temperature for 8 hours. Thereafter, a vacuum was applied, reducing the pressure in the flask to about 20 mm. and the heating at about 210° C. was continued for about 1.5 hours, after which the contents of the flask were discharged. The resulting product was a light colored resin having a Gardner color of 3–4 and an acid number of about 14.

This polyester resin was blended with 40 weight percent of styrene to form a solution having a viscosity of about 100 c.p.s. Castings of this solution were cured in a conventional manner, using benzoyl peroxide and heat. The casting were cured for 16 hours at 70° C. and 1 hour at 90° C. to form a flexible copolymeric composition. Samples of the castings were immersed in distilled water, some in 5% aqueous caustic solution, and others in 25% acetic acid solution at 210° F. to test their resistance against deterioration. After 90 days in the solutions, the castings were removed and the percent retention of tensile strength was determined. The casting in the distilled water retained 92.5% of its tensile strength, 59.8% retention in caustic and 68.4% retention in acetic acid.

*Example II*

1803 g. (1.58 moles) of polyoxyethylene (20) isopropylidene diphenol were charged to a 3 liter round bottom flask equipped as in Example I. 155 g. (1.0 mole) of maleic anhydride and about 0.2 g. of hydroquinone were added to the flask at room temperature. The reactants were heated at 210° C. for 5 hours after which the contents of the flask were discharged. The resulting polyester resin had an acid number of about 13.

*Example III*

1411 g. (2.01 moles) of polyoxypropylene (10) isopropylidene diphenol were charged to a 3 liter round bottom flask equipped as in Example I. 227 g. (1.96 moles) of fumaric acid and about 0.4 g. of hydroquinone were added to the flask at room temperature. The reactants were heated at about 210° C. for 13 hours. The contents of the flask were discharged, and it was determined that the resulting polyester resin had an acid number of about 13. This polyester resin was blended with 40 weight percent of styrene to form a solution having a viscosity of about 400 c.p.s.

*Example IV*

A styrene solution containing 70 weight percent of the flexible polyester resin of Example I was blended in equal parts by weight with a styrene solution containing 50 weight percent of a rigid polyester resin prepared from polyoxypropylene (2.2) isopropylidene diphenol esterified with fumaric acid. This blend of polyester resin solutions was used to prepare cured castings which were cured by heat and a benzoyl peroxide catalyst as in Example I.

One of the castings was subjected to a thermal shock test which comprised subjecting it to liquid nitrogen temperature followed by subjecting it to boiling water temperature. The casting prepared from rigid polyester resin blended with the flexible polyester resin of this invention withstood 25 shock treatments without any sign of cracking or crazing.

As used in the claims which follow, the term "consisting essentially of" includes compositions containing the named ingredients and any other ingredients which do not deleteriously affect the compositions for the purposes stated in the specification.

Having completely described this invention, what is claimed is:

1. A curable, flexible polyester resin comprising the esterification product of a dihydric alcohol represented by the formula

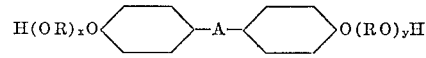

wherein A is 2-alkylidene radical having from 3 to 4 carbon atoms, R is an alkylene radical having from 2 to 4 carbon atoms, $x$ and $y$ are each at least one and the average sum of $x$ and $y$ is at least 10 and not more than 20, esterified with an approximately equimolar quantity of dicarboxylic acid, at least the major portion of which comprises an alpha unsaturated dicarboxylic acid.

2. The polyester resin of claim 1 in which R is a propylene radical.

3. The polyester resin of claim 2 in which the alpha unsaturated dicarboxylic acid is fumaric acid.

4. The polyester resin of claim 3 in which A is an isopropylidene radical.

5. The polyester resin of claim 4 in which the average sum of $x$ and $y$ is about 16.

6. A composition of matter consisting essentially of a homogeneous blend of an aromatic vinyl compound and from about 5% to about 95% by weight of said compound of a flexible polyester resin comprising the esterification product of a dihydric alcohol represented by the formula

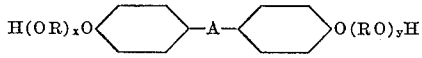

wherein A is a 2-alkylidene radical having from 3 to 4 carbon atoms, R is an alkylene radical having from 2 to 4 carbon atoms, $x$ and $y$ are each at least one and the average sum of $x$ and $y$ is at least 10 and not more than 20, esterified with an approximately equimolar quantity of dicarboxylic acid, at least about 80 mole percent of which comprises an alpha unsaturated dicarboxylic acid.

7. The composition of claim 6 in which the aromatic vinyl compound is styrene.

8. The composition of claim 7 in which R is a propylene radical.

9. The composition of claim 8 in which the alpha unsaturated dicarboxylic acid is fumaric acid and the average sum of $x$ and $y$ is about 16.

10. A composition of matter consisting essentially of the composition of claim 6 blended with a rigid polyester resin prepared from aromatic type hydroxyl bearing materials.

11. The composition of claim 10 in which the aromatic vinyl compound is styrene.

12. The composition of claim 11 in which the alpha unsaturated dicarboxylic acid is fumaric acid and the average sum of $x$ and $y$ is about 16.

References Cited by the Examiner
UNITED STATES PATENTS

| | | | |
|---|---|---|---|
| 2,499,363 | 5/50 | De Groote et al. | 260—613 |
| 2,634,251 | 4/53 | Kass | 260—863 |
| 2,836,576 | 5/58 | Piccard | 260—860 |

MURRAY TILLMAN, *Primary Examiner.*

LEON J. BERCOVITZ, *Examiner.*

UNITED STATES PATENT OFFICE
CERTIFICATE OF CORRECTION

Patent No. 3,214,491                          October 26, 1965

Joseph J. Stanton

It is hereby certified that error appears in the above numbered patent requiring correction and that the said Letters Patent should read as corrected below.

Column 2, line 31, for "when" read -- which --; lines 68 and 69, for "volautilization," read -- volatilization, --.

Signed and sealed this 19th day of July 1966.

(SEAL)
Attest:

ERNEST W. SWIDER                          EDWARD J. BRENNER
Attesting Officer                             Commissioner of Patents